(12) United States Patent
Naqvi

(10) Patent No.: US 10,320,781 B2
(45) Date of Patent: Jun. 11, 2019

(54) SYSTEM AND METHODS FOR SHARING AND TRADING USER DATA AND PREFERENCES BETWEEN COMPUTER PROGRAMS AND OTHER ENTITIES WHILE PRESERVING USER PRIVACY

(71) Applicant: Sensoriant, Inc., Cedar Knolls, NJ (US)

(72) Inventor: Shamim A. Naqvi, Morristown, NJ (US)

(73) Assignee: Sensoriant, Inc., Cedar Knolls, NJ (US)

( * ) Notice: Subject to any disclaimer, the term of this patent is extended or adjusted under 35 U.S.C. 154(b) by 238 days.

(21) Appl. No.: 15/475,748

(22) Filed: Mar. 31, 2017

(65) Prior Publication Data

US 2018/0167201 A1    Jun. 14, 2018

Related U.S. Application Data

(60) Provisional application No. 62/451,253, filed on Jan. 27, 2017, provisional application No. 62/431,657, filed on Dec. 8, 2016.

(51) Int. Cl.
*H04L 29/06* (2006.01)
*H04L 9/32* (2006.01)

(52) U.S. Cl.
CPC ........ *H04L 63/0861* (2013.01); *H04L 9/3231* (2013.01); *H04L 9/3236* (2013.01); *H04L 63/0407* (2013.01); *H04L 2209/38* (2013.01)

(58) Field of Classification Search
CPC . H04L 63/0861; H04L 9/3231; H04L 9/3236; H04L 63/0407

USPC ........................................................ 713/168
See application file for complete search history.

(56) References Cited

U.S. PATENT DOCUMENTS

| 2002/0186838 A1 | 12/2002 | Brandys |
| 2005/0114662 A1 | 5/2005 | Meyer et al. |
| 2007/0185869 A1 | 8/2007 | Kirnak |
| 2008/0228767 A1 | 9/2008 | Kenedy |

(Continued)

FOREIGN PATENT DOCUMENTS

WO    2016/083618 A1    6/2016

OTHER PUBLICATIONS

Chen et al. Sensor-Based Activity Recognition. 2012. [retrieved on Apr. 5, 2018). Retrieved from 1-16 the Internet:<URL:http://ieeexplore.ieee.org/stamp/stamp.jsp?tp=&arnumber=6208895>. entire document.

(Continued)

*Primary Examiner* — Farid Homayounmehr
*Assistant Examiner* — Thanh T Le
(74) *Attorney, Agent, or Firm* — Stuart H. Mayer; Mayer & Williams, PC.

(57) ABSTRACT

Systems and methods are provided which allow computer programs or other entities to share user data and information so that users may be authenticated and their preferences shared among entities in networked environments and machines. Cryptographic credentials are generated for these purposes. While the credentials can be shared to provide entities with user authentication and preference data, a salient feature of the sharing technology is that the user is always in control of, and integral to, the sharing protocol. Moreover, the sharing preserves the privacy of the user's data.

22 Claims, 15 Drawing Sheets

(56) References Cited

U.S. PATENT DOCUMENTS

| | | | |
|---|---|---|---|
| 2012/0131184 A1 | 5/2012 | Luna et al. | |
| 2012/0324231 A1 | 12/2012 | Camenisch | |
| 2013/0055367 A1 | 2/2013 | Kshirsagar | |
| 2013/0174244 A1* | 7/2013 | Taveau | G06F 21/30 726/9 |
| 2013/0218837 A1 | 8/2013 | Bhatnagar | |
| 2014/0085050 A1 | 3/2014 | Luna et al. | |
| 2014/0112470 A1* | 4/2014 | Shen | G06F 21/57 380/47 |
| 2014/0129826 A1* | 5/2014 | Mendelovich | H04L 63/0428 713/155 |
| 2014/0287723 A1 | 9/2014 | LaFever et al. | |
| 2015/0058633 A1* | 2/2015 | Liu | H04L 63/0823 713/175 |
| 2015/0288694 A1* | 10/2015 | Liebl | G06F 21/31 713/182 |
| 2015/0372814 A1 | 12/2015 | Ali et al. | |
| 2016/0094991 A1* | 3/2016 | Powell | H04W 12/06 455/411 |
| 2016/0127902 A1* | 5/2016 | Ciarniello | H04L 63/0838 380/247 |
| 2016/0142380 A1* | 5/2016 | Fuller | G06F 21/6254 726/9 |
| 2016/0210626 A1* | 7/2016 | Ortiz | G06Q 20/023 |
| 2016/0328713 A1* | 11/2016 | Ebrahimi | H04L 9/3066 |
| 2016/0381003 A1* | 12/2016 | Caceres | H04L 63/0823 713/156 |
| 2017/0019255 A1 | 1/2017 | Kamakari et al. | |
| 2017/0301031 A1 | 10/2017 | Naqvi | |
| 2018/0026796 A1* | 1/2018 | Oberheide | H04L 9/3247 713/176 |
| 2018/0144114 A1* | 5/2018 | Fiske | H04L 9/3239 |
| 2018/0262493 A1* | 9/2018 | Andrade | H04L 63/0861 |

OTHER PUBLICATIONS

Sasson et al., "SNARKs for C: Verifying Program Executions Succinctly and in Zero Knowledge" 53 pages, Oct. 7, 2013.

* cited by examiner

| STEP | ACTION |
|---|---|
| PROVISIONING STEP | USER COMPUTING DEVICE REQUESTS KGE, PGE AND LOGIC L1 FROM SERVICE PROVIDER |
| 1 | USER COMPUTING DEVICE CREATES BIOMETRIC DATASET OF USER. COMPUTING DEVICE REQUESTS KGE, PGE AND LOGIC L1 FROM SERVICE PROVIDER |
| 2 | COMPUTING DEVICE GENERATES EO-2, PROOF P1, PK1 AND VK1 WITH INPUT BIOMETRIC DATASET AND LOGIC L1 TO KGE AND PGE. SENDS EO-2, P1 AND VK1 TO SERVICE PROVIDER |
| 3 | SERVICE PROVIDER USES KGE & PGE WITH INPUTS LOGIC L2 AND (MODIFIED) EO-2 TO PRODUCE PK2, VK2, PROOF P2 AND EO-3. SENDS P2, EO-3 AND VK2 TO STORAGE SYSTEM |
| 4 | STORAGE SYSTEM MAY ADD NEW DATA TO EO-2 TO GET MODIFIED EO-3; IT USES LOGIC L3, (MODIFIED) EO-3 AS INPUT TO KGE & PGE TO PRODUCE PROOF P3, PK3, VK3 AND EO-4. IT ENCAPSULATES P3 AND EO-4 INTO A CREDENTIAL AND SENDS IT TO REQUESTING COMPUTING DEVICE; SENDS VK3 TO VERIFIER |
| 5 | COMPUTING DEVICE RECEIVES CREDENTIAL |
| 6 | COMPUTING DEVICE PRESENTS CREDENTIAL TO VENDOR; STEPS 4 AND 5 ARE EXECUTED <u>ATOMICALLY</u> |
| 7 | VENDOR REQUESTS VERIFIER TO VERIFY THE PRESENTED CREDENTIAL |
| | VERIFIER VERIFIES THE CARD USING PVE AND RESPONDS ACCORDING TO THE OUTPUT OF PVE |

*FIG. 5B*

| STEP | ACTION |
|---|---|
| 1 | PREFERENCE PROVIDER CREATES HEURISTIC KNOWLEDGE ABOUT USER BY PROCESSING USER DATA. OFFERS PREFERENCE CARDS TO PROSPECTIVE USERS |
| 2 | IN ONE EMBODIMENT THE USER STATES A PREFERENCE TO THE COMPUTING DEVICE. IN A SECOND EMBODIMENT THE COMPUTING DEVICE REQUESTS AND RECEIVES A PREFERENCE FROM A PREFERENCE PROVIDER. IN A THIRD EMBODIMENT, THE COMPUTING DEVICE REQUESTS THE BROKER FOR THE ADDRESS OF A PREFERENCE PROVIDER. COMPUTING DEVICE REQUESTS AND RECEIVES A PREFERENCE FROM THE PREFERENCE PROVIDER |
| 3 | COMPUTING DEVICE REQUESTS AND RECEIVES KGE, PGE AND LOGIC L1 FROM CREDENTIAL ISSUER. NOTE THAT IN THIS CASE, UNLIKE FIG. 5A AND 5B, WE DO NOT POSSESS BIOMETRIC DATA. THE DATASET USED HEREIN IS THE PREFERENCE DATA PROVIDED IN STEP 2 ABOVE |
| 4 | FOLLOW STEPS 1-7 OF FIG. 5B RESULTING IN A PREFERENCE CREDENTIAL BEING PRESENTED TO A VENDOR OR BEING STORED IN A WALLET APP FOR LATER USE |

*FIG. 7*

| 37 | 42 | 64 |
| :--- | :--- | :--- |
| i | ii | iii |
| 31 | 48 | 34 |
| iv | v | vi |
| 36 | 47 | 33 |
| vii | viii | ix |

*FIG. 13A*

```
i,37      →      1
ii,42     →      2
iii,64    →      3
iv,31     →      1
v,48      →      2
vi,34     →      3
vii,36    →      1
viii,47   →      2
ix,33     →      3
```

*FIG. 13B*

| 1 | 2 | 3 |
| :---: | :---: | :---: |
| 3 | 1 | 2 |
| 2 | 3 | 1 |

*FIG. 13C*

PROVING KEY = ENCRYPTION KEY = SEQUENCE OF HEXADECIMAL CHARACTERS

VERIFYING KEY = DECRYPTION KEY = SEQUENCE OF HEXADECIMAL CHARACTERS

- - MISSING CELL VALUE

CONSTRAINT = SUM OF EACH ROW AND COLUMN IS EQUAL.

| - | 2 | 3 |
|---|---|---|
| 3 | 1 | - |
| - | - | 1 |

- - MISSING CELL VALUE

*FIG. 14B*

1. DECRYPT "PROOF" TO GET ONE COMPONENT OF PUZZLE, I.E., FIG. 14A AND THE CONSTRAINTS USING THE DECRYPTION KEY

COMBINE OUTPUT DATASET "DATA-2" FROM FIG. 14B WITH ABOVE DECRYPTED COMPONENT TO GET COMPLETED OBJECT (SUDOKU)

VERIFY CONSTRAINTS ARE SATISFIED

IF YES, RETURN "TRUE"; ELSE RETURN "FALSE"

*FIG. 15*

SYSTEM AND METHODS FOR SHARING AND TRADING USER DATA AND PREFERENCES BETWEEN COMPUTER PROGRAMS AND OTHER ENTITIES WHILE PRESERVING USER PRIVACY

BACKGROUND

User information is collected and used by almost every website and Internet enterprise. User information is also shared between enterprises, mostly through bilateral agreements in which users whose information is being shared play no part. Thus, one commercial entity may sell its historical customer usage data to another entity. Some enterprises even use selling of customer profiles and data as their primary business model. Several Internet companies are racing to build computer programs and devices that contain (embedded) computer programs such as digital assistants and robots. Several enterprises have suffered user data breaches and such incidents seem to be increasing in number and ferocity of attacks. Thus, a data sharing mechanism that is both efficient and preserves user privacy will be of significant social and commercial benefit.

SUMMARY

In one aspect, systems and methods are described herein which allow computer programs or other entities to share user data and information so that users may be authenticated and their preferences shared among entities in networked environments and machines. The sharing method provides and maintains several properties that may be desirable to both users and businesses. A salient feature of the sharing technology is that the user is always in control of, and integral to, the sharing protocol.

In one embodiment, as smart devices (e.g., smart appliances) are increasingly being embedded in various environments (e.g., homes, businesses) and as the ability to control and regulate various environmental parameters increases, the methods and systems described herein may be viewed as an operating system for the environment, the operating system being imbued with concerns addressing the privacy of user data. In another embodiment, data and heuristic knowledge inferred by computing entities and machines are encapsulated in forms that allow them to be treated as tradable units of commerce.

BRIEF DESCRIPTION OF THE DRAWINGS

FIG. 5B illustrates one example of the steps performed to authenticate a user using the cryptographic authentication credentials described herein.

FIG. 7 illustrates one example of the steps performed to create and use the cryptographic preference credentials described herein.

FIGS. 13A, 13B, 13C and 13D show illustrative components that are inputted to and outputted by KGE.

FIGS. 14A and 14B show illustrative components that are inputted to and outputted by PGE.

FIG. 15 shows an illustrative working of the PVE.

DETAILED DESCRIPTION

Figure 1:
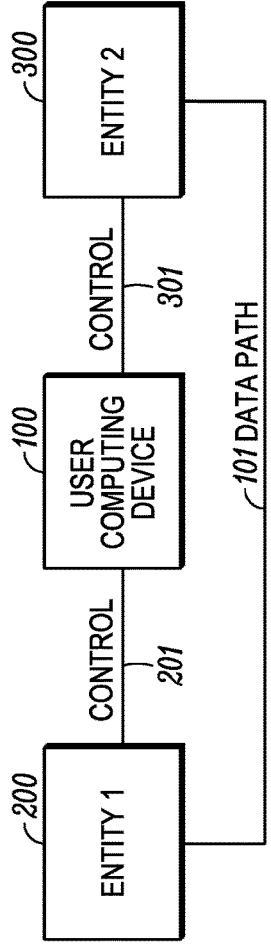
FIG. 1 shows a computing device controlling the exchange of data between two entities.

In the following description, numerous specific details are set forth in order to provide a thorough understanding of exemplary embodiments or other examples described herein. However, it will be understood that these embodiments and examples may be practiced without the specific details. In other instances, well-known methods and procedures have not been described in detail, so as not to obscure the following description. Further, the embodiments disclosed are for exemplary purposes only and other embodiments may be employed in lieu of, or in combination with, the embodiments disclosed.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Motivation

As several enterprises race to develop computer programs, it is becoming clear that enterprises who have acquired more user data have an inherent advantage. At the same time, it is also clear that no single entity will have an all-powerful computer program that has all the user data that it needs to perform the necessary tasks. Necessarily, user data will continue to be fragmented across several enterprises and will need to be acquired or shared between computing entities.

Recently, a class of computer programs, i.e., smart programs, have been developed that analyze user data to arrive at heuristic decisions. Exemplary smart programs include programs referred to as Assistants, Voice-Activated Assistants, Robots, AI (Artificial Intelligence) programs, chatbots, and smart programs embedded in devices such as self-driving cars, mobile autonomous vehicles and robots, etc.

As an example of a typical smart program consider a voice-activated computer program that accepts input in spoken English from a user and responds in English, the responses including suggestions and recommendations. For example, such a program may recommend a recipe for a Chicken dish, even though the user's input to the program ("What is a good dish to cook today") may not have explicitly specified Chicken as an ingredient, i.e., the computer program infers that the user "likes" chicken.

Such an inference is often said to be "smart" since the computer program makes heuristic judgments about the user's request. Such judgments may be wrong in some cases but program designers assume and maintain that having access to user data improves the heuristic's performance; and having more user data improves it further.

In the simple example cited above, the question arises, from where did the smart program get the user data that is used to make its heuristic decisions? In some cases, the smart program may have access to historical user data collected over time by the entity that has created the smart program. In some cases, a third-party entity may provide the data under a business agreement to the latter entity. That is, we may imagine a process of data acquisition in which a first entity establishes a (possibly real-time) interface with a second entity by way of which a smart program may interface and request data from the latter entity. We may think of the smart program inquiring about the user's preference regarding virtually anything, including such disparate things as a choice of protein, driving route preference, music preference while driving, type of cuisine or restaurant preference, etc.

To provide just one specific example where user data may be employed, several enterprises have announced the construction and development of smart cars in which the software logic is capable of driving occupants to their destinations under autonomous control, i.e., self-driving cars. In such a scenario, we expect that passengers will prefer and desire to customize many features of the car and the ride characteristics of the car, such as music played in the car, the temperature maintained in the car, the driving mode—sporty, race car fashion, tourist, casual—, the route selected to the destination, etc. While these could be input manually into the systems of the car, a large selling point of such development efforts is that people will need to own fewer cars since one can be called upon request. Thus, a user may get different cars at different times and entering personal preference information each and every time may become cumbersome. It would thus be advantageous and convenient for a customer to impose his preferences on a smart car rather than tying or binding his preference to a single car (as is done today).

As the number of smart programs continue to increase, people's daily lives will comprise more interactions with such smart entities and environments—homes, offices, cars, shops, factories—controlled by such programs. It would be extremely cumbersome to authenticate oneself to all such entities and express one's preferences on an individual basis. Automatic means will be needed to impose customer authentication and preferences on smart devices, programs and environments.

As another example, consider the so-called case of conversational commerce. A type of "chatbot" is a smart computer program that "listens in" on an ongoing chat or instant messaging session between two users and interjects with suggestions. Imagine two mobile/smart phone users engaged in a text or instant messaging session wherein they discuss the possibility of meeting each other for lunch. A chatbot, "listening in" on this conversation, may interject and suggest a restaurant and offer to make a reservation. Several questions arise, some of which may be listed as follows.

How did the chatbot know the identity of the one or more participants in the chat session?

Did the chatbot know what type of restaurant is preferred by one or both users?

If the answer to the above question is negative, did it get such preference information from a second entity (computer program, enterprise)?

And if so, how did it authenticate the user(s) to the second entity?

How did the second entity provide the preference information? In processed form? Or unprocessed form (data) requiring subsequent processing?

We thus see that for computer programs to be smart, they will continue to need more and more user data and that not all the required user data likely will be owned by any one single entity. Thus, by necessity, user data exchange or sharing will be needed in the emerging world of smart computer programs.

Moreover, smart computer programs or entities incorporating smart computer programs receiving data or preferences about a user need to ensure the integrity of the data, the authenticity of its occupants, etc. Certainly, a user of a smart car may not want the smart car software logic to get erroneous or malicious data from an external entity. For instance, it has been reported that computers installed in cars have been hijacked by hackers. A smart car whose software logic gets hacked may prove to be physically dangerous to its occupants.

Additionally, while a user may approve of a smart computer program embedded in, e.g., a robot, getting his information, he may not want his information to be revealed to any other entity without his permission. Users worry about the privacy of their data, controlling access to their data and keeping their data secure.

In one particular aspect, the subject matter described herein is concerned with answering the question, how do we tell an entity such as a smart computer program or a device in which such a smart computer program is embedded who we are, what we like and how do we permit that entity to provide selected portions of our information to other entities?

Conventional approaches to data sharing in the context of conventional computer programs have used user identification and passwords by which a user may authenticate himself to a first computer program, e.g., software controlling access to a website. A user may then transmit his user name and password to a second computer program. For example, a first website may access a second website on behalf of a user by using the user's credentials. However, sharing of credentials in such a manner across computer programs is considered unsafe. For example, financial institutions do not approve of users to share their credentials across different enterprises. In some cases, computers communicating by Application Programming Interfaces (APIs) use passwords embedded in the methods of the API.

More recently, biometric information has been used as credentials to authenticate a user to a service provider. For example, mobile or smart phones may use fingerprint data from a user to authenticate him to one or more websites. However, users generally do not wish their biometric data to be shared with a service provider because of privacy concerns.

To circumvent this issue, smart phones keep the fingerprint data in a local memory of the smartphone itself and use a token that is recognized by participating service providers. Typically, these service providers need to have software, called an "app", resident on the smart phone that accepts the token from (the operating system of) the smart phone and transmits it (or a representation) to the participating service provider. Such a method begets a closed system of service providers, all participating in the acceptance of a common set of tokens (or representations of such generated by their apps).

In short, a user can authenticate himself to his e.g., smart phone using his biometric data, the smart phone, in turn provides a token whose validity is then accepted by other service providers. Thus, the user is permitted access to a participating service provider's system due to the service provider trusting the operating system of the smart phone.

In one aspect, the subject matter described herein allows the trust placed in a token from an enterprise to be replaced with a method, i.e., a sequence of steps or actions carried out by one or more (possibly distributed) computing entities manipulating cryptographic objects. Such a method can then be verified independently of any vendor, device or platform.

The verification may thus be carried out in a device and platform independent manner. Such independence is crucial in its security implications. A trust model that relies on a single enterprise is inherently unsafe and susceptible to attack because it is a single point of failure. In a device and platform independent method distributed amongst many computing entities, different entities may check other entities and the method, as a whole, may continue to perform its functions even if some parts are under attack. For instance, it should be noted that the robustness of Internet transport or routing relies on having multiple paths between a source and destination (IP) address. As a further example, telecommunications networks often use distributed computing entities to achieve desired levels of reliability. Likewise, data centers distribute their data in geographically separated entities.

Furthermore, encapsulating user data as credentials that may be securely verified (without violating user data privacy) frees users from creating and remembering user names and passwords, a known source of privacy invasion and problems in security of computer operations.

In another exemplary conventional mechanism, two enterprises may enter bilateral business agreements to share user data and define one or more Application Programming Interfaces (API) to effectuate the data sharing.

Smart devices are being installed in many physical environments such as homes, restaurants and retail stores. Smart devices include devices containing one or more processors, one or more network interfaces and one or more sensors to sense environmental indicia from their surroundings. In some instances, smart devices may transmit or broadcast data to other devices in their environment. The goal is to create a computational component to "geography" by which a user may be provided services such as rendering a user's favorite music or playlist or controlling various aspects of the physical world, e.g., regulating temperature in a room.

Again, we see from the above exemplary applications, the need for smart devices to obtain knowledge of a user's preferences, likes and other data concerning the user so that an environment may be customized to a user's liking. In this sense, one aspect of the subject matter described herein may be viewed as an operating system for geographical spaces, the system being imbued with concerns addressing the privacy of user data.

Authentication Credentials

FIG. 1 shows one example of an operating environment in which aspects of the subject matter described herein may be employed.

A user computing device 100 controls the data exchange between entities 200 and 300, the data pertaining to the user of the computing device 100, wherein the interfaces 201 and 301 may facilitate the control messages and the data itself may use the interface 101. In certain embodiments, the data may be relayed via the control interfaces also.

Illustrative examples of user computing device 100 includes, without limitation, mobile communication devices (e.g., cellular phones, smart phones), personal computers, laptops, tablet computers, personal digital assistants (PDAs) and devices and systems in which such user computing devices are embedded or otherwise incorporated.

The control interfaces may be used to authenticate the user of the computing device 100, the latter may contain data that may be used in the authentication. Additionally, the computing device 100 may contain information that may be used to select and specify elements of the user data that can be shared between the two entities.

As has been described above, the entities 200 and 300 may be computer programs, websites, smart programs, robots, or other entities in which computer programs or the like may be embedded. The interfaces 101, 201 and 301 may be wired or wireless technologies, with or without use of cloud computing resources, or other intermediary resources.

As stated above, one aspect of the subject matter described herein involves the use of methods, i.e., sequences of steps carried out by one or more computing entities, that manipulate cryptographic (digital) objects. The methods, generally, result in producing cryptographic (digital) objects that can be verified using computational functions (software) in a device and platform independent manner.

Moreover, the data contained within such cryptographic objects may relate to a user's biometric data, e.g., finger print data, or one or more of his preferences, e.g., user prefers classical music. Thus, once a cryptographic object is verified it may be used to authenticate a person or to encapsulate his preferences, depending upon the nature of the data contained within the object. Thus, a cryptographic object containing a user's biometric data may be used to authenticate the user; a cryptographic object containing a user's musical preference may be used to determine the type of music a user prefers.

In the sense described above, it may now be seen that cryptographic digital objects may be derived, using the methods discussed herein, which may authenticate a user or encapsulate his preferences. That is, such objects may be viewed as cryptographic credentials referring to his identity or his preferences.

In particular, we will have occasion to describe the use of cryptographic authentication credentials to authenticate users and encapsulate his preferences via (cryptographic) preference credentials. In some embodiments, we use the term "card" (respectively, authentication card, preference card) to mean (authentication/preference) cryptographic credentials.

Figure 2:
FIG. 2 illustrates the data exchange mechanism using cryptographic objects.

FIG. 2 depicts the elements used by the user computing device to control the data sharing. User computing device 100 acquires various cryptographic objects that may be interpreted using only methods described herein. The details of the acquisition process are given below.

In one embodiment, the cryptographic credentials are encapsulated into physical objects called "authentication cards" or "preference cards". Such cards may then be used much as conventional cards, e.g., credit/debit cards used in financial transactions, the purchase of goods, etc. However, the data encapsulated in such cards allows manipulation and processing by the methods of the present invention.

To highlight the distinction between conventional cards and physical cards containing cryptographic data objects discussed in the above embodiment, consider the verification process of cards. Conventional cards may only be verified by the card issuing entity. For example, VISA verifies the cards it issues. By contrast, the physical cards discussed herein may be verified by any entity that implements the verification functions (software) discussed herein, and not necessarily by the card issuing entity.

Furthermore, in one embodiment of the present invention, cryptographic cards may be produced by a user utilizing his user computing device and one or more computer programs obtained from a third party. The user also produces the necessary verification (software) tools. Users may then provide the verification tools to a third party that may be contacted by a vendor wishing to authenticate the user. Thus, unlike conventional cards that are produced by the card issuing authority who is also responsible for their verification, cryptographic cards may be produced by the user who may also (optionally) produce the necessary verification tools. It is thus seen that the technology described in the subject matter herein engenders new methods that are distinct from those used with conventional cards.

Certain conventional physical credit/debit cards now contain processor(s) and programmed circuitry. These may be used, as an example, by a vendor to verify a card that has been presented to it. The verification typically involves using a special device that activates the programmed circuitry in the card, which, in turn, may interact with one or more servers of the card issuing entity (or the point of sale terminal).

In contrast, the present invention creates cryptographic credentials that in some cases are encapsulated in cards that may be used to verify the identity or preference of a user by any entity operating the methods of the present invention, not necessarily the card issuing entity.

Furthermore, the process of verifying a cryptographic credential, whether or not encapsulated in a card, is privacy-preserving in a manner discussed below. Such privacy-preserving verification processes present another distinguishing feature from the current state of the art.

In some embodiments the cryptographic credentials described herein may fall into one of two main categories distinguished by their most common, but not exclusive, use. The first category is referred to as authentication cryptographic credentials (300, cf. FIG. 2) that may be used to authenticate a user. In prior art, authentication is described as the process by which a user establishes his identity.

The second category is referred to as preference (or authorization) cryptographic credentials (200, cf. FIG. 2). Prior art describes authorization as the process by which access rights to resources may be specified, viz., "to authorize" is to specify an access policy to resources. To explain the important distinction between authentication and authorization consider, by way of example, a user who logs in to a website by using his user name and password. This action may comprise user authentication. Having been authenticated, the website may enforce a policy by which the user may be granted access to certain data or based on the user's preferences. The latter action refers to authorization. Two different users who successfully authenticate themselves to the website may be granted entirely different data access policies based on their preferences.

In the present invention, authorization/preference credentials are based on either a user stated preference, e.g., John likes classical music, or based on analyzing user data. That is, an entity may analyze a user's data that leads it to conclude that the user likes classical music. A cryptographic credential authorizing the sharing of user preferences, referred to herein as a preference cryptographic credential, when presented to an entity, allows that entity to make use of the user preference data. For instance, a preference cryptographic credential that includes a user's musical preferences may allow an entity to play background music in a geographical area that is consistent with the user's musical preferences as expressed by his preference credential.

A vendor may process a user's purchase data to infer or derive the user's likes. Thus, the vendor in the above example, may process a user's music purchase data to infer that the user in question likes classical music. Such inferences and derivations may use artificial and machine intelligence and heuristic techniques that are well-known in prior art.

A vendor that has made the effort to process user data to arrive at heuristic refinements pertaining to one or more users, may offer "preference credentials" and respond to requests from users or other computing entities for such credentials. For example, it may send out offers to various users that it is willing to provide them with music preference credentials. As another example, it may register its offer with online broker computing entities who arbitrate user requests for a preference credential amongst a plurality of providers. A computer program may request a broker (another computer program) to provide it addresses of preference credential providers for given users. For example, consider a user who enters a smart home where a smart program, wishing to regulate the temperature of the house, requests the user's smart device to provide it a temperature preference credential. (We may assume the program controlling the temperature seeks authorized requests for its own record keeping requirements.) Assuming the user's smart device does not possess such a credential, it may, in turn, ask a broker to provide it the address of such a preference credential provider. (Certainly, the user may be asked to state such a preference directly but we seek to automate such tasks to reduce the demand on users; moreover, in more complicated scenarios, users may not know what they prefer. For example, blind tests often reveal preferences that surprise users.) Once such a credential has been procured (the procuring process is described later), the user's smart device may then present the received credential to the smart program controlling the temperature of the home.

Advantageously, the above described phenomenon may engender a new business model wherein heuristically acquired knowledge becomes an instrument of trade. A networking environment may be envisaged in which computer programs engage in trading heuristically acquired knowledge. Note that such trading in heuristically acquired knowledge may require certain assurances, guarantees or estimates of accuracy and confidence so that trading parties may be protected and use the knowledge appropriately. In one embodiment, the trading in heuristically acquired knowledge is supported and facilitated by tools utilizing methods that operate on cryptographic objects and which preserve certain crucial properties such as data accuracy, data verification and user privacy.

We shall return to an exposition of the above embodiment of the invention after discussing certain aspects of cryptographic credentials.

Figure 3:
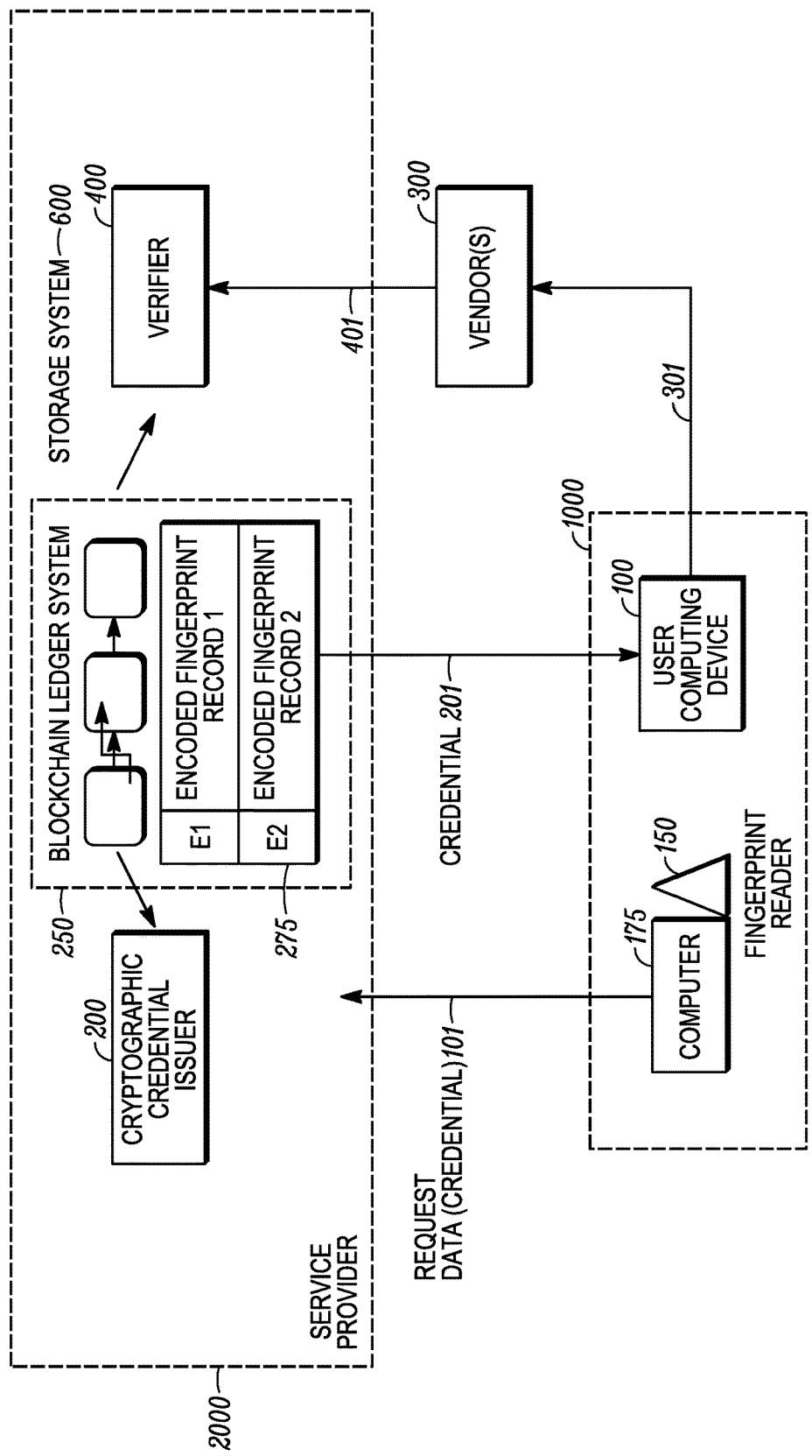
FIG. 3 shows one example of an operating environment in which aspects of the subject matter described herein may be practiced to generate and use cryptographic authentication credentials.

FIG. 3 shows a general architecture of one example of an operating environment in which aspects of the disclosed subject matter may be practiced. User computing device 100 may contain one or more processors, one or more network interfaces and one or more sensors to sense various environmental indicia such as Geo-Positioning Satellite (GPS) signals, temperature, motion, etc. Examples of computing devices, without limitation, are smart phones, personal digital assistants (PDA), tablet computers, laptops, smart cars, autonomous mobile robots, etc.

Computer 175 is a conventional computer or server with one or more network interfaces. Examples of computers, without limitation, are desktop computers with one or more processing units, laptops, server machines, collections of computers, etc. The fingerprint reader 150 is a physical unit that facilitates capture and processing of a user's fingerprint data and is assumed to be mostly conventional. In certain embodiments, device 150 may be attached as a peripheral device to computer 175, while in other embodiments it may be integrated into 100 or 175. In certain embodiments, computing device 100, fingerprint reader 150 and computer 175 may be integrated into a single computing device 1000. Modern smart phones represent one example of the integrated computing device 1000. In what follows, for reasons of brevity, we use the term "device 1000" to denote an integrated device as disclosed above or one or more of the various components 100, 150 and 175, relying on context to disambiguate the usage.

The fingerprint device 150 is one example of a device that facilitates capture and use of a user's biometric data. There are other examples of user's biometric data, such as retina scans, camera sensors that capture facial features, voice signature imprint, etc., that may also be used for identifying users. The use of the fingerprint biometric data in the present invention is purely exemplary and is not intended to limit the invention in any way.

In one embodiment of the present invention, the user's fingerprint data is captured by the fingerprint reader 150 and sent using computer 175 to the computing device 100. (In an alternative embodiment, the facial features of a user may be captured as data by a camera sensor and sent to the user computing device 100.) For example, computing device 100 and computer 175 may use a Wi-Fi or Bluetooth radio connection to transmit and receive the fingerprint data. As described above, various combinations are possible by which devices 150, 175 and 100 may be arranged to enable computing device 100 to come into possession of the fingerprint or other biometric data of a user.

A service provider 2000 is a server complex, i.e., a collection of one or more servers, in network connection with device 1000 using wired or wireless technologies 101. Device 1000 may use connection 101 to transmit requests and biometric data (fingerprint data for exemplary purposes) that has been suitably encoded and encrypted as discussed below. Connection 101 may be further assumed to be made secure by using one of several well-known protocols such as secure http.

Note that there may exist several service providers, each having its own server complex. In one embodiment, the service provider 2000 comprises sub-units that perform certain functions. FIG. 3 shows the functional sub-units Card Issuer 200, Storage System 600, and Verifier 400. In other embodiments, the sub-units may represent individual enterprises.

In one embodiment, the storage unit 600 uses a blockchain ledger system 250 (cf. FIG. 3) for storing and recording data and transactions. (More generally, the storage unit 600 may use conventional (distributed) database technology such as relational databases.) That is, the card issuer is assumed to use the blocks of a distributed ledger to access and store data. (As is well-known in prior art, new blocks may get added to the ledger and previous blocks may be accessed to retrieve historical records.)

An example of the kind of data that is stored on the ledger is shown as 275 (cf. FIG. 3). The card issuer 200 creates (as disclosed later) a cryptographic object called an encoded fingerprint record E1 (275, FIG. 3) corresponding to (and "associated" with, in a sense disclosed later) the fingerprint data of the user. The use of a Blockchain System 250 by Issuer 200 is proposed without limiting the present invention in any manner.

Network connections 101 and 201 are wired and/or wireless connections that may be used by device 1000 to request, send and receive data from the various components of the server complex 2000.

Network connection 301 is a wired and/or wireless connection that may be used by device 1000 to present data to a vendor 300. In certain embodiments, vendor 300 may be a computer program, a robot, smart assistant, a chatbot, autonomous computing entity, a website, etc.

Network connection 401 is a wired or wireless connection that may be used by vendors to request verification of data from the verifier, 400.

We will have occasion to use the term "proof" in subsequent discussions. We now disclose the general method by which certain cryptographic objects, called "proofs", are created from datasets, such as a user's fingerprint data.

We assume the existence of three engines KGE (Key Generating Engine), PGE (Proof Generating Engine) and PVE (Proof Verifying Engine). As is known in prior art, each of these engines may be implemented on one or more computers executing special software logic. A convenient way of describing the functioning of the various engines is to treat them as "block box" devices as shown in FIGS. 4A, 4B, 4C and 4D, respectively.

KGE (111, cf. FIG. 4A) accepts as input a computer program (service logic L, 100) and a dataset 200 (e.g., user data such as biometric data e.g., fingerprint data). It produces two cryptographic keys, PK 300 and VK 400 called the proving key and the verifying key, respectively. It also produces an encoded object (EO) 500 based on the input dataset 200. For example, in the case of the input dataset being a user's fingerprint data, the EO may represent features extracted from the fingerprint data. Examples of such features may be the ridges and whorls detected in a user's fingerprint.

As an example, software logic has been released in the public domain by Amazon and other Internet providers that processes facial and fingerprint data, recognizes features (such as whorls in fingerprints and facial features in photographs) and creates output datasets of such features. Furthermore, current practice allows such software logic to be used in KGE-like systems (see, for example, "Snarks for C: verifying program executions succinctly and in zero knowledge", by Eli Ben-Sasson, et al., which is available at https://eprint.iacr.org/2013/507.pdf).

It is important to note that the EO, PK and VK produced by the KGE are a function of the input dataset and the input software logic. Any changes to either the software logic or the input dataset engenders a different PK, VK and EO to be produced. Furthermore, the complementarity of PK and VK is dependent on the inputted dataset and software logic.

The term "cryptographic key" refers to digital data objects that satisfy the following properties.
(C1) The data comprising the keys, if rendered on a display screen may appear as a random sequence of binary (hexadecimal) digits.
(C2) No two distinct input objects will produce the same output keys.
(C3) An input object always produces the same output key every time, if it has not been altered in any way.

PGE (222, FIG. 4B) accepts the encoded object EO 500 (produced by KGE as an output) and the proving key PK 300 (produced by KGE) and produces a cryptographic object called the proof, P (555) and a new dataset Data-2 550 that is a function of the input EO 500. The object "P 555" satisfies the property that, if displayed, it appears as a random collection of (hexadecimal) digits.

PVE (333, FIG. 4C) accepts as input a verifying key, VK (400), produced by the KGE, a proof object P (555) produced by the PGE, and Data-2 (550) and outputs either "true" or "false". It produces the response "true" if and only if all the following conditions are true; otherwise it produces the response "false".
the dataset 550 is produced by PGE 222 L2 (cf. FIG. 4B);
the key VK is produced by KGE;
the proof object P (555) is produced as output by PGE 222 (cf. FIG. 4B).

Figure 4A:
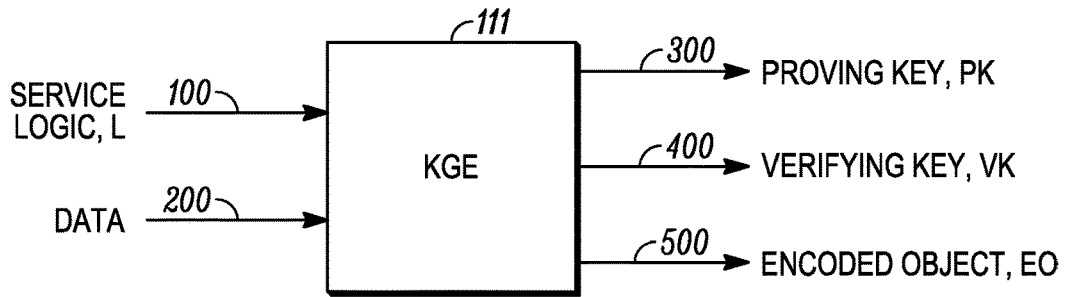
FIG. 4A is a functional block diagram illustrating the operation of a Key Generating Engine (KGE) that generates cryptographic keys and objects.
Figure 4B:
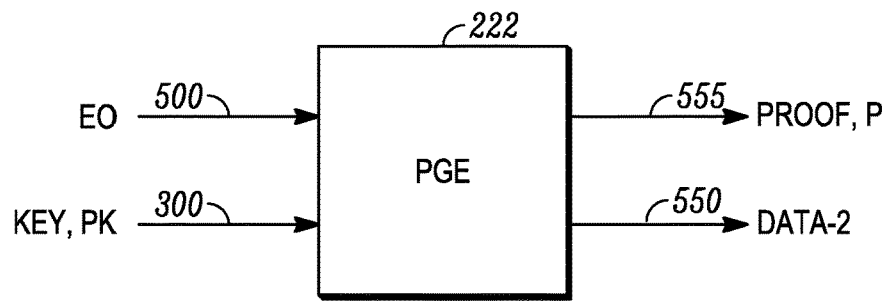
FIG. 4B is a functional block diagram illustrating the operation of a Proof Generating Engine (PGE) that generates a cryptographic proof.
Figure 4C:
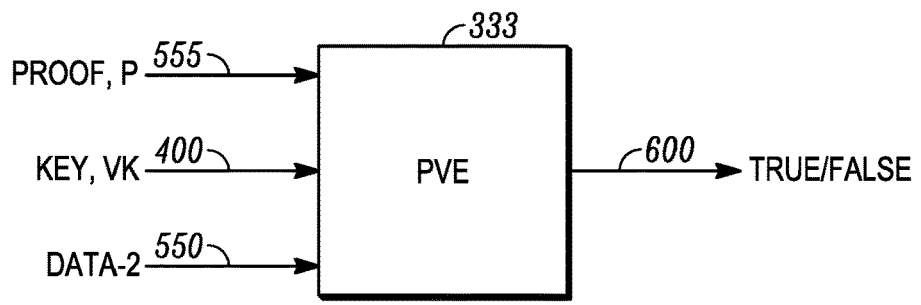
FIG. 4C is a functional block diagram illustrating the operation of a Proof Verifying Engine (PVE) that verifies the accuracy of the cryptographic credential.
Figure 4D:
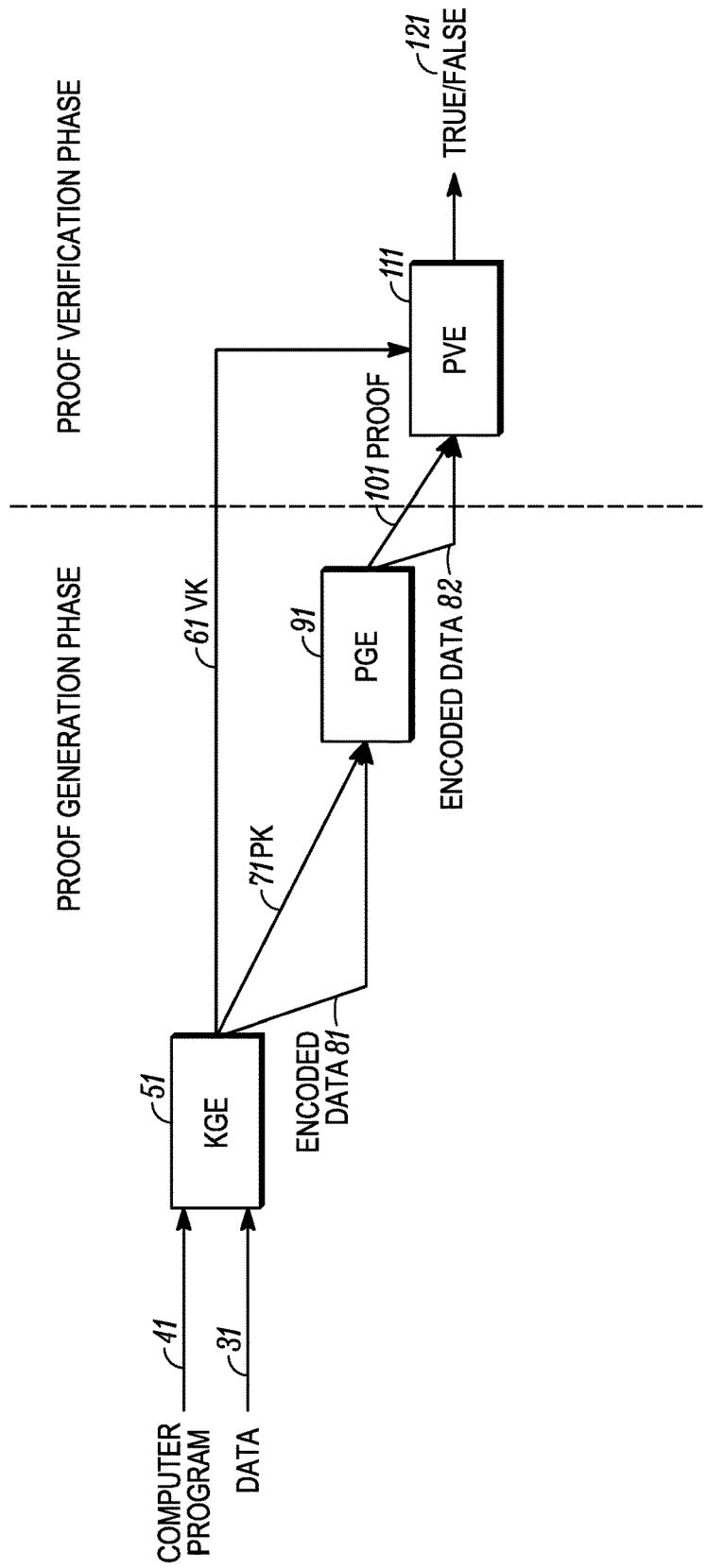
FIG. 4D summaries the manner in which the KGE, PGE and VGE are used.

That is, as shown in FIG. 4D, the use of KGE, PGE and PVE are to be viewed as a sequence of inter-connected operations. A computer program (equivalently, service or software logic) 41 and dataset 31 are fed as input to KGE 51 that produces encoded dataset 81, PK 71 and VK 61 as output. PK 71 and data 81 are fed as input to PGE 91. PGE 91 produces a proof object 101 and encoded-dataset 82.

Continuing with FIG. 4D, the outputs VK 61, Proof 101, encoded dataset 82 are fed as input to PVE 111 that produces either "true" or "false" as output 121, accordingly.

Note that engines KGE, PGE and PVE may be freely available from one or more service providers as special software packages that can be downloaded and run on general purpose computers, computing devices, smart devices, etc.

We now show and discuss enabling examples of constructing and using KGE, PGE and PVE.

It is well-known in prior art that a user's fingerprint data when captured by fingerprint sensors/scanners may be represented as a matrix of data, typically a 1000×1000 matrix (see, for example, "Using Chebyshev's inequality to determine sample size in Biometric evaluation of fingerprint data" by J. Chu et al., National Institute of Standards and Technology, Gaithersburg, Md.). For ease of discussion, we limit our enabling example to a dataset with 9 samples, i.e., a square 3×3 matrix as shown in FIG. 13A. (Similarly, user's facial data may also be captured as datasets; understandably, facial datasets are larger in size than fingerprint datasets.)

The functioning of the engine KGE may now be explained by recourse to FIGS. 13A, 13B and 13C as follows.

FIG. 13A shows the exemplary dataset for a fingerprint data of a user as a 3×3 matrix. The cells of the matrix are numbered one through nine using roman numerals (i, ii, etc.); the cell values are shown as integers 37, 42, etc. In FIG. 13B we map each cell value and its position as a pair to one of the integers 1, 2 or 3 as shown. The pairs represent the cell number and the cell value, thus (i,37) means the sample value 37 in cell "i" of the matrix, etc.

We now construct a 3×3 Sudoku Puzzle (or Latin Square) using the integers 1, 2 and 3. One such arrangement is shown in FIG. 13C. As is well-known, Sudoku puzzles satisfy the constraint that the sum of each row and column is equal. (In the example shown in FIG. 13C, the cell values of each row and column add up to 6.)

Whereas the Sudoku Puzzle was chosen to be of order (i.e., dimensions) 3×3 and the input dataset was also assumed to be a matrix of order 3×3, this is merely coincidental. We may choose a Sudoku Puzzle of any order as long as its number of cells is larger than or equal to the number of entries in the mapping table, i.e., FIG. 13B. Note that the order of a Sudoku Puzzle is related to its computational intractability. Thus, engineers may wish to determine the order accordingly.

It is to be noted that knowledge of the Sudoku arrangement of FIG. 13C cannot be used to derive the matrix of FIG. 13A without possessing the data of FIG. 13B. That is, going from FIG. 13A to FIG. 13C via FIG. 13B is clear but reversing, i.e., deriving FIG. 13A from FIG. 13C—without knowledge of FIG. 13B—is computationally intractable.

As will be explained later in the current application, the data represented by FIGS. 13A and 13B will always be stored in the user computing device and not transmitted to any other entity. Embodiments of the present invention will use the dataset represented by instances of the dataset shown in FIG. 13C. In this manner, the private data of the user is always kept in the user computing device and, as such, is private; the credentials themselves that are generated and verified are based on (irreversible) representations of the private data.

Thus, the functioning of KGE may be described as a software program (engine) that takes a fingerprint dataset and another computer program L as input. The program "L" manipulates the input dataset to produce the mapping (such as shown in FIG. 13B) and from it produces a Sudoku Puzzle, such as shown in FIG. 13C in the clear.

Figures 13D, 14A:
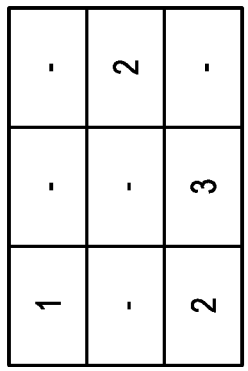

Additionally, the engine KGE produces an encryption key representing the computer program "L" and a corresponding decryption key (FIG. 13D). Prior art describes how encryption and decryption keys may be produced. We refer to the two keys as the proving and verifying keys, respectively. Note, that the encryption and decryption keys may be used to detect any changes to the logic "L" as is known in prior art.

Now we describe an enabling example of PGE with the help of FIGS. 14A and 14B.

Taking the output dataset of FIG. 13C, we split it into two parts shown as FIGS. 14A and 14B. Clearly, the two parts may be combined to yield the original dataset of FIG. 13C. However, consider a Sudoku Puzzle with missing values (i.e., given a Sudoku Puzzle with blank values, find a solution). It is known in prior art that "solving" a Sudoku problem is "hard" for computer programs. For example, it has been estimated that a 9×9 Sudoku puzzle has tens of trillions of possible solutions (6,670,903,752,021,072,936, 960). The term "hard" is well-known in computer science as characterizing problems that are difficult to solve using computers because of the enormous number of possibilities (combinations) that need to be tried.

Thus, PGE may be described as an engine that takes as input a completed Sudoku, such as shown in FIG. 13C and a proving (encryption) key and produces as output two (split) pieces of the input Sudoku (as shown in FIGS. 14A and 14B). Furthermore, PGE encapsulates one of the two split pieces along with the Sudoku constraints, viz., the sum of each row and column must be equal, in an encrypted object (using the encryption key) called the "proof" and the second split piece of the Sudoku in the clear as a dataset "data-2". Thus, FIG. 14A is the proof and FIG. 14B is the output dataset "data-2" of PGE.

Now we describe an enabling example of PVE with the help of FIG. 15 as follows.

Given the decryption (verifying) key as input and the "proof" object of FIG. 14A, we can produce a decrypted version of the proof, FIG. 15 step 1, and combine it with the input dataset shown in FIG. 14B to obtain a final dataset. Using the constraints contained in the decrypted "proof" object (step 1), we may verify if the final dataset satisfies the constraints or not. In the former case, PVE returns "true" and in the latter, it returns "false".

Thus, the working of PVE may be explained as an engine that takes as input a decryption (verifying) key, a proof object representing one encrypted piece of the Sudoku puzzle and its constraints, and a corresponding second piece of the Sudoku Puzzle. The engine combines the two pieces of the Sudoku Puzzle and verifies its correctness with respect to the (decrypted) constraints in the proof object. If the constraints are satisfied, PVE outputs "true"; else it outputs "false".

Note, that the computational intractability of the Sudoku Puzzle and that of breaking the encryption key, implies that when we split a Sudoku Puzzle into two pieces and distribute them to different entities, we are relying on the fact that any entity that comes into possession of one piece of the Puzzle will require enormous computational power to "solve" the problem, i.e., compute the missing piece; whereas, an entity that has the decryption key and the two pieces of the puzzle may combine them with a relatively small computational effort.

Figure 5A:
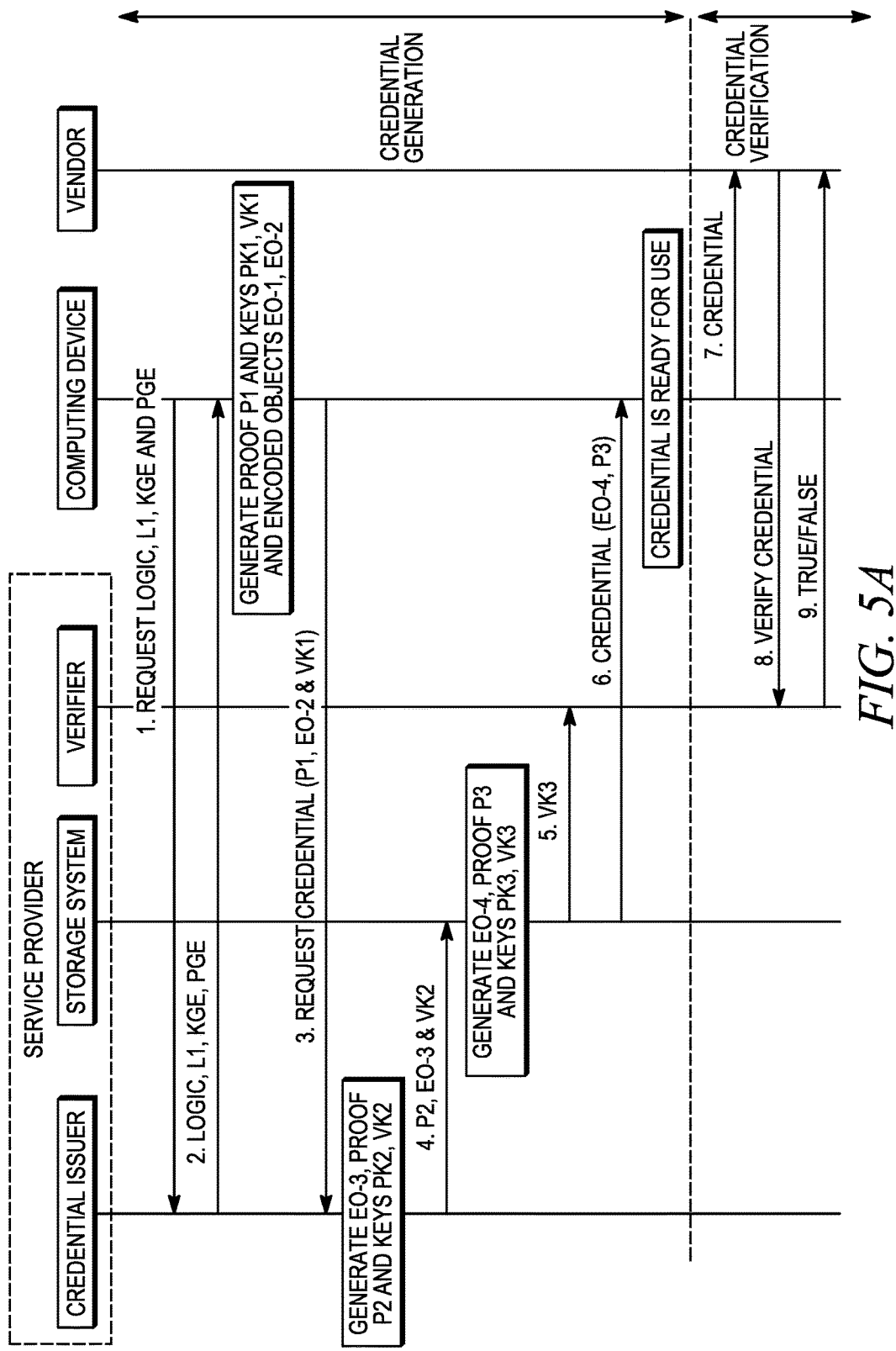
FIG. 5A is a sequence diagram illustrating one example of the process of generating and verifying cryptographic authentication credentials and the exchange of messages containing logic, cryptographic keys and objects between a service provider, computing device, and a vendor with whom the computing device interacts.

We now disclose the general method by which a user may authenticate himself with the help of FIG. 5A.

In step 1 (FIG. 5A) (computing) device requests a specific service logic (a computer program) from a service provider (cryptographic credential issuer unit).

In step 2 the computing device receives the requested logic, L1, and the engines KGE and PGE. Steps 1 and 2 may be considered as comprising a service provisioning phase.

The computing device, having received KGE and the logic L1 may now utilize them to process the user's fingerprint data. Prior art teaches that service logic may be constructed that processes fingerprint data to extract feature sets that may result in an encoded object (EO).

Thus, as shown in FIG. 4A, we may input the logic L1 and the fingerprint data obtained by the computing device 100 from the fingerprint reader 150 and computer 175 (cf. FIG. 3) to KGE to obtain an encoded object EO-1 and the proving and verifying keys, PK1 and VK1 respectively.

Next, as shown in FIG. 4B, we may now input the EO-1, PK1 and the original dataset to PGE that will produce the proof object P1 and encoded dataset EO-2. Thus, at this juncture, the computing device may possess PK1, VK1, the datasets EO-1 and EO-2, and a proof object P1.

It is important to observe that the proving key represents the fact that logic L1 was used by KGE to manipulate a dataset and produce the encoded object EO. This assertion may be verified by any entity that possesses the key VK1, the encoded object EO-1 and the proof P1.

Consequently, consider the case in which the computing device may now send EO-2 to the service provider who provided it the logic L1, PGE and KGE and request it to act as a verifier as follows. The computing device may now provide P1 and VK to a vendor as its authentication credentials. The vendor, in turn, may transmit the P1 and VK to the service provider (acting as a verifier) who may use it as input to PVE (we are assuming that the service provider possesses PVE—this is a reasonable assumption since it provided the associated KGE and PGE to the computing device in step 2 above), along with the previously received EO-2 and respond to the vendor's request positively or negatively depending on the output of PVE. (There is an additional aspect of this verification that we will discuss in more detail below.)

Thus, the general idea may now become clear. The computing device converts its fingerprint data to a group of cryptographic objects, namely, a proof object, an encoded dataset, a proving key and a verifying key.

In one embodiment, we may encapsulate the proof and the encoded dataset into a single object and call it a credential. We may provide a service provider, referred to as a Verifier, the proving key. If we now present the credential object to a vendor, the latter may contact the Verifier and request it to verify the presented credential. The Verifier may use the engine PVE with inputs comprising the credential and the verifying key to respond correspondingly.

Alternatively, we may encapsulate the verifying key and the proof object into a credential object and provide the encoded dataset to the Verifier.

Thus, we may form the credential object by encapsulating the verifying key and the proof object, or by encapsulating the verifying key with the encoded object, etc. That is, different combinations of the three components (verifying key, encoded dataset, proof object) may be distributed between the computing device and the Verifier.

Furthermore, different workflows may be envisaged in which the computing device presents credentials to a vendor who then requests verification from the Verifier. Since, we may combine and distribute the three components—verifying key, proof object and encoded dataset—amongst the credential and Verifier in multiple ways, the various workflows need to ensure that the Verifier receives all three components, enabling it to perform the verification process.

We now present an illustrative embodiment using some of the concepts and methods discussed so far. Consider a user with a computing device that wishes to create authentication credentials based on his biometric data such as fingerprint or facial dataset obtained from a suitable biometric capturing device (e.g., finger print reader or a camera producing a facial image dataset).

Having so obtained the biometric dataset, the user acquires from a service provider the systems KGE, PGE and software logic that processes biometric datasets. The user inputs his biometric dataset and the software logic to KGE to produce a processed dataset and the keys PK and VK as per FIG. 4A. Next the above processed dataset and PK are input to PGE to produce a proof object and an encoded dataset as per FIG. 4B.

After these steps, the user possesses his proving key PK, his original biometric dataset, the processed dataset, the encoded dataset, verifying key VK and the proof object. We may refer to the encoded dataset and the proof object taken together as the authentication credentials.

The user now sends the verifying key to a service provider (including possibly the one who provided him the KGE, PGE and software logic in the above steps) who may now act as a verifying authority, described as follows.

The user presents his authentication credentials to a vendor and the vendor may send them to be verified by the verifying authority. (We may assume that the vendor is informed about the network address of the verifying authority in an out-of-band process.) The verifying authority obtains the PVE system in a, possibly a priori, out-of-band process from a service provider and uses it to verify the presented credentials and the previously received VK from the user as per FIG. 4C. If PVE responds positively (outputs true) to the input credentials (proof and the encoded dataset) and the received VK, the vendor is informed that the credentials are authenticated. If the PVE responds negatively (outputs false), the vendor is informed that the credentials are not valid, i.e., the vendor may decline to accept the presented credentials.

We thus see that a user may receive software logic, the KGE and PGE systems and use them with his biometric dataset to produce a set of authentication credentials and a verifying mechanism that can be utilized to verify the credentials by one or more third party entities. As stated above, the trust model in the verification entails that the KGE, PGE and PVE systems are deemed cryptographically secure.

As discussed above, there is security in distributing the various methods of authentication amongst several entities and to not rely on a single entity such as the user computing device alone (as in the above described embodiment). It is thus desirable to have multiple entities participate in the creation, storage and verification of credentials; however, a user's personal biometric data is kept in the user computing device under the control of the user for reasons of personal privacy.

To achieve this goal, as shown in FIG. 3, the service provider may comprise multiple sub-units (Credential Issuer 200, Storage System 600, Verifier 400) or the sub-units may be independent business entities. Thus, the units processing and storing the objects distributed by the user computing device and performing the verification functions, may need internal record keeping for information received and requests verified. Therefore, the need arises to explain the internal working of the various units of the service provider entity 2000 (cf. FIG. 3). We provide such an explanation by continuing the description of the method illustrated in FIG. 5A. It should be noted, however, that in some embodiments the service provider may not have any of the sub-units described herein and thus there may only be a single set of keys PK, VK and a single cryptographic proof.

Continuing the description of FIG. 5A, (having described steps 1 and 2 above) in step 3, the proof object P1, dataset EO-2, and verifying key VK1 are packaged into a request to the credential issuer for a new credential. The credential issuer unit processes the received request. The issuer may also use the engines KGE and PGE because it may wish to use modified service logic L2 that is different from L1, i.e., the logic that was provided to the requesting computing device. An example of the need to use such modified logic is that the issuer may wish to record the time and date of receipt of the request for the credential as a part of the received encoded dataset EO-2, thereby producing an "augmented dataset EO-2". The issuer may now input the "augmented dataset EO-2", his logic L2 into KGE and PGE respectively to obtain PK2, VK2, Proof P2 and encoded dataset EO-3.

In step 4, proof P2, encoded dataset EO-3, and VK2 are sent to the Storage system, which may augment the received dataset EO-2, by adding local data such as time/date of request to get "augmented EO-3". Additionally, the storage system may use its own version of logic, L3, and provide L3 and "augmented EO-3" to KGE and PGE respectively to get PK3, VK3, EO-4 and proof P3.

In step 5, the key VK3 is sent to the verifying unit. In step 6, the proof P3 and encoded dataset EO-4 are encapsulated into an object called a "credential" and sent to the requesting (user) computing device. The credential is now deemed ready for use by the (user) computing device.

As discussed above, steps 5 and 6 may use different combinations of the three components—proof object, verifying key and encoded object—and distribute the same amongst the computing device and the Verifier. Thus, for example, we may:
 send VK3 & EO-4 to computing device and P3 to Verifier
 send VK3 to Verifier and EO-4 and P3 to computing device, etc.

In step 7, the device may present the credential to a vendor.

It is important to note that we need to be careful in the execution of steps 6 and 7 because of a potential vulnerability. At the conclusion of step 6 the credential is ready to be used by the computing device. In step 7 the computing device initiates the process of using the credential.

A malicious entity may intervene between steps 6 and 7, gain access to the credential, and present it maliciously to a vendor.

In one embodiment, the above possibility is overcome by requiring that steps 6 and 7 be implemented as "atomic" operations. Prior art teaches the combining of one or more operations into a single "indivisible" unit such that either all or none of the individual components of the unit are executed.

Indeed, the above requirement of atomicity presents a strong technical reason for using storage system (600, cf. FIG. 3) for recording the various objects and requests discussed in the present invention since atomic operations comprise basic and fundamental operations in storage systems such as databases and block-chain systems.

In step 8, the vendor forwards the presented credential to the verifier unit. Note that in one embodiment the presented credential contains the proof P3 and the dataset EO-4.

In step 9, the verifier verifies the credential using P3, EO-4 and previously received VK3 as input to the engine PVE, obtaining a true/false output and responds to vendor accordingly.

We now present an alternative embodiment that does not require the atomicity of steps 6 and 7 above, thusly, the credential received by the computing device may be stored and used later by the computing device. For example, an app such as a wallet app may be used to store the credential and later present it to a vendor for authentication. Modified steps 6 and 7 of the alternative embodiment are presented below (all other steps of the previous embodiment remain unchanged).

(Alternative embodiment: step 6): Credential is received and stored by computing device (e.g., in a wallet app).

(Alternative embodiment: step 7): We assume the user computing device has acquired software, say "S", in a provisioning step that allows it to compute and compare (match) feature recognition sets from fingerprint data. Next, in a provisioning step, the user computing device uses "S" to derive a fingerprint dataset of the user referred to as dataset "D1".

Continuing now with the description of the alternative embodiment step 7, user initiates a process on his computing device to present his credential to a vendor. The computing device requests the user to provide a new set of fingerprint data and, uses the logic "S" to derive a new fingerprint dataset "D2" from the user. Now, the software "S" matches the datasets "D1" and "D2" and upon successful match, the user computing device may proceed to present the user's stored credentials to the vendor. If the two datasets D1 and D2 do not match, the computing device may not allow the credential to be presented to the vendor.

Thus, the atomicity of steps 6 and 7, as required by the previous embodiment may be obviated by the modified steps 6 and 7 above.

FIG. 5B summarizes the above method of FIG. 5A.

In a provisioning step, a computing device creates a fingerprint dataset of a user and requests service provider for KGE, PGE and logic L1.

In step 1, having received KGE, PGE and L1 from a service provider, the computing device provides KGE with the logic L1 and its fingerprint dataset as inputs to produce a new dataset EO-1 and the keys PK1 and VK1. Using EO-1, PK1 and VK1 as input to PGE, the computing device produces a proof object P1 and encoded dataset EO-2. Computing device sends P1, VK1 and EO-2 to the service provider.

In step 2, the service provider receives P1, VK1 and EO-2. It may add local data to EO-2. It may also use its own (proprietary) version of service logic, L2, different from L1 provided to the computing device. The service provider uses L2 and (modified) EO-2 as inputs to KGE produce PK2, VK2 and EO-3. The latter three components are provided as input to PGE to generate the proof object P2 and the encoded dataset EO-3. Proof P2, EO-3 and VK2 are sent to the storage system.

In step 3, the storage system may add local data to Data-2 to get a modified dataset. It may also use its own version of logic, L3. Using L3 and the modified dataset as input to KGE, it produces PK3, VK3 and EO-4. The latter three components are input to PGE to produce proof P3 and encoded dataset EO-4.

In one embodiment, the storage system encapsulates P3 and EO-4 into an object called a credential and sends it to the requesting user. It may then send VK3 to the Verifier.

In step 4 the computing device receives the requested credential and in step 5 presents it to a vendor. The steps numbered 4 and 5 are executed atomically.

In step 6 the vendor requests the verifier to verify the presented credential that uses PVE to respond accordingly in step 7.

Alternative embodiments discussed above may package and distribute the three components—proving key, verifying key and proof object—in various combinations between the device and the verifier.

In another embodiment in which the computing device stores the requested credential for later use, the use of atomicity in steps 4 and 5 is obviated. The credentials so obtained may be stored in one or more applications, e.g. a wallet app. The stored credentials may then be presented to a vendor based on following the methods provided by the wallet app. For example, the app may request the user to authenticate himself to the app before the app may present a credential to a vendor.

Preference Credentials

We have discussed the encapsulation of a user's identity as a cryptographic credential, in a device and platform independent fashion, which may be presented to authenticate the user to one or more entities such as service providers or other computer programs. Without loss of generality, we will concentrate our presentation on generating credentials for user preferences and the sharing of user data between computer programs, in general, and particularly between smart computer programs. As mentioned previously, smart computer programs typically utilize user data to arrive at heuristic decisions. Examples of smart computer programs include digital assistants, voice activated assistants, chatbots, and computer programs incorporated within other devices such as autonomous vehicles (e.g., smart cars, autonomous aircraft such as unmanned aerial vehicles UAVs, autonomous ships) and robots. However, we note that the present invention applies to general computer programs that may need to share user data.

People prefer to implement their preferences on a variety of devices and situations. For instance, we prefer certain kinds of music, we prefer certain kinds of weather and temperature, we set our car seats and the car's environment to our preferences, we prefer certain cuisines, etc.

A system may glean a user's preferences in many ways. Two such avenues are as follows.

The user states his preference to the system, e.g., John states that he likes classical music.

A system, in possession of user data, analyzes the data to derive or infer the preferences of a user. For example, a user's purchase history at an online bookstore may indicate the types of books he likes. The system may then use the derived preferences or may share them with another computer program.

As devices, homes and environments become more automated, it is becoming possible to impose a user's preferences on them. For example, a user entering a smart home may desire the temperature to be set to his preference by a smart temperature controlling thermostat, for the lights to be turned off (or on) in certain rooms by a smart light actuator, etc.

We seek systems and methods by which a user may communicate his preferences to one or more programs and for a computer to share a user's preferences with another computer program.

It may seem a simple matter for a person to communicate his preferences to a computer program. However, the increasing automation of our lives may require an overwhelming number of such communications. If most of the devices, situations and environments we encounter in our daily activities can accept our preferences, we will benefit from automated ways of communicating our preferences to all such devices.

Furthermore, no single computer program may possess all the user data that it needs to provide services to the user. As described above, the situation may become particularly acute for smart programs. A user entering a rented smart car or other vehicle may wish the car to acquire his preferences from a smart car that he owns (or the manufacturer's computer system) that knows his preferences. A user entering a retail store may wish to hear his preferred music in the background while he is shopping.

Turning now to the perspective of the smart device that receives a user's preference (from the user or a service provider), it may also wish to record the receipt of the preference. It may wish to ascertain that the user is authenticated. For example, a smart car may wish to ensure that the occupant of the car is the same person who rented the car. Thus, from the smart device's perspective, the user may need to be authenticated and his preferences may need to be authorized.

As described above, the present invention proposes a data sharing paradigm between computers that requires that the sharing between the respective computer programs be mediated by the user, e.g., his computing device (cf. FIG. 1).

Furthermore, we propose that a user's preferences (stated by the user or derived from user data) may be encapsulated as cryptographic preference credentials, along lines similar to the above described authentication credentials. Whereas the latter were based on biometric data of the user, the former may be based on a user's statement or directive; they may also be based on user data such as a user's purchase history.

Figure 6:
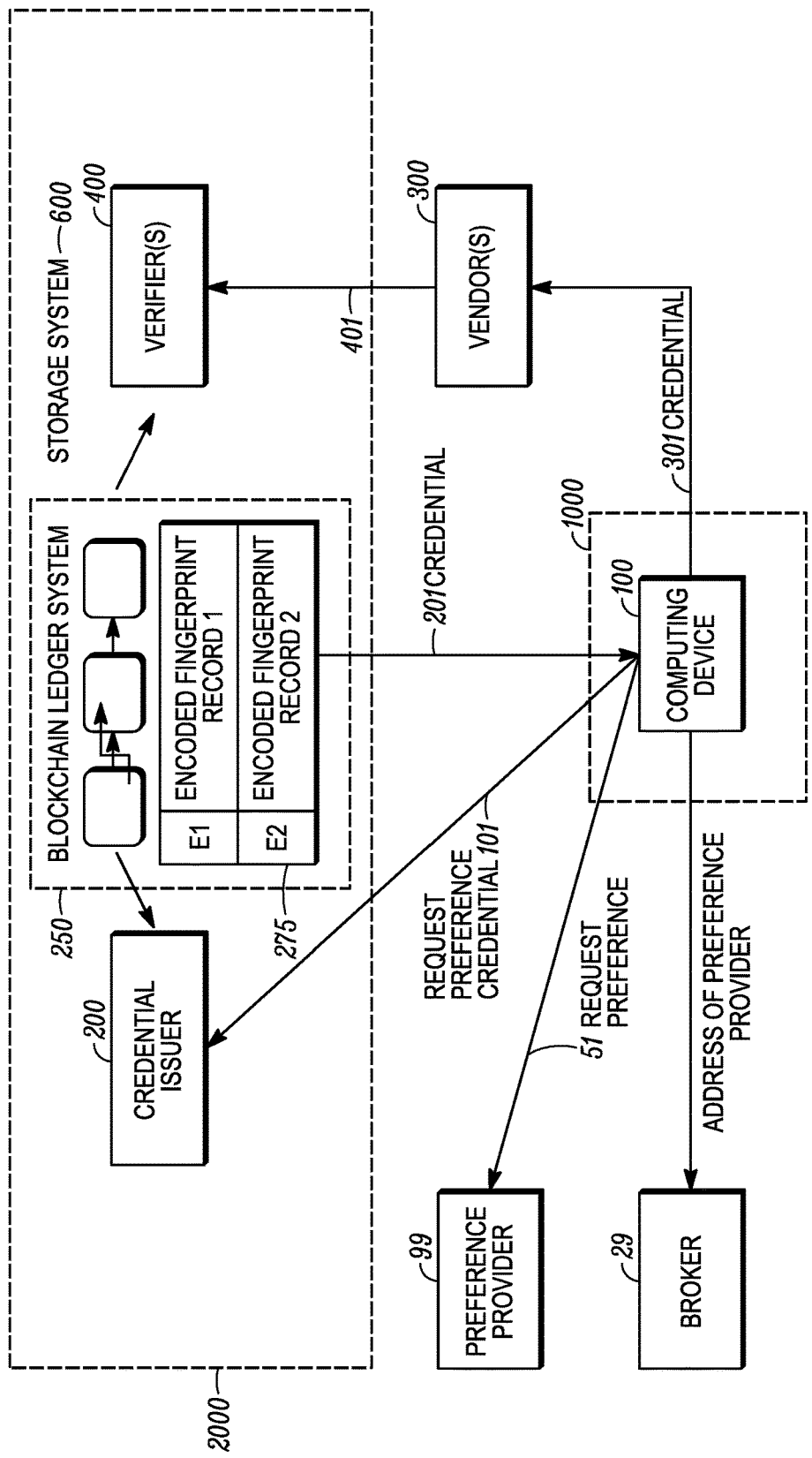
FIG. 6 shows one example of an operating environment in which aspects of the subject matter described herein may be practiced to generate and use cryptographic preference credentials.

FIG. 6 shows the general system architecture for generating and verifying preference credentials. The system architecture is similar to the architecture shown in FIG. 3. We highlight the differences below.

As described in FIG. 3, computing device 100 may contain or be in direct connection with components that are capable of capturing a user's biometric data. The computing device may then subsequently be assumed to have acquired authentication credentials. That is, the computing device 100 in FIG. 6 acts according to the arrangement shown as device 1000 in FIG. 3.

In an alternative embodiment, the computing device 100 FIG. 6 may not possess authentication credentials.

Preference provider 99 (cf. FIG. 6) is a service provider in possession of user data who may have processed it to derive one or more user preferences. For example, preference provider 99 may be a vendor who has acquired purchase data of various users over time whose user preferences may then be inferred. Provider 99 may advertise his willingness to provide such derived preferences in response to user requests.

Broker 29 is a computer program that provides network addresses of Preference Providers upon request.

FIG. 7 shows the general method of creating preference credentials and their verification. The method is similar to FIG. 5B. We highlight the differences below.

In step 1 (FIG. 7), the data provider possessing user data may process it to create heuristic knowledge about the user. The data provider offers (preference) credentials to prospective users.

Step 2 (FIG. 7) discusses three possible embodiments.

The user states preferences to the computing device and the preferences may be encapsulated as a dataset and used by the computing device to generate the preference credentials.

The computing device requests a preference provider to provide it user preferences. Again, the computing device may encapsulate the provided preference data as a dataset to be used to generate preference credentials.

The computing device may request an entity called the broker to provide it a network address of a preference provider who may provide it user preferences. It uses the provided address to request the preference provider for the user's preference data and encapsulates it as a dataset to be used to create preference credentials.

In step 3 (FIG. 7) the computing device requests and receives logic L1, KGE and PGE. As described above, these may be used, along with the user preference dataset as input, to produce EO-2, PK1, VK1 and P1. That is, step 3 of FIG. 7 is identical to step 1 of FIG. 5B except that the input dataset is the user's preference data and not the user's biometric data.

The remaining steps of the method of FIG. 7 largely proceed as in steps 2-7 of FIG. 5B. However, one distinction between the process of generating a cryptographic authentication credential and a cryptographic preference credential is that the user preference data needs to be included in the cryptographic preference credential so that it may be accessed and used by third parties. That is, the user preference data needs to be included in the cryptographic preference credential in an unencrypted form, i.e., in the clear. In contrast, as explained above, the encoded datasets EO-1, etc., are in the clear but do not contain any data that is relevant to the user, i.e., the data in these datasets relate to the Sudoku Puzzles. (This was a design feature since we wish to keep any and all user authentication data in the user computing device for reasons of privacy.)

The unencrypted user preference data may be incorporated into the preference credential in any of a number of ways that in part may depend on the party that is creating the preference credential. For instance, in one embodiment, if the user computing device generates the preference credential, the user computing device itself may add the user preference data to the preference credential as follows.

We assume that the logic L1 supplied by the service provider (along with the engines KGE and PGE to the user computing device) is modified to seek user input, viz., the user is allowed to state his preference when the logic L1 is executed by KGE.

Figure 8:
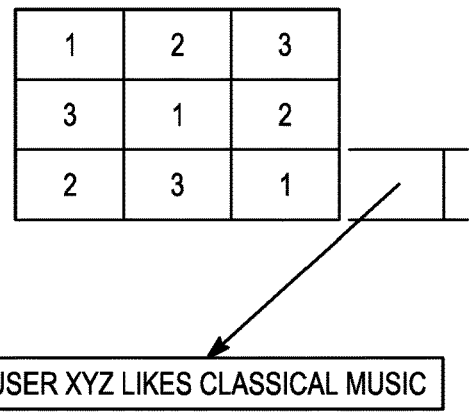
FIG. 8 illustrates an encoded object containing a user specified preference.

The logic L1 then takes the user stated preference as input and encapsulates it in the output dataset. Thus, the input to L1 comprises the user stated preference only, i.e., there is no other user data. The logic L1 may be configured in such cases to produce a "default" Sudoku Puzzle of a certain order. For example, in the enabling embodiment of KGE, the encoded dataset outputted by KGE was a Sudoku puzzle shown in FIG. 13C. We map add a special cell to the encoded dataset containing the user stated preference as shown in FIG. 8 where the default Sudoku Puzzle is a 3×3 puzzle on the integers 1, 2 and 3. Note, that the added "special" cell with its user stated preference as cell value does not alter the working of the Sudoku puzzle or the methods based on the puzzle.

In another embodiment, a service provider encodes a user's previous historical usage dataset and provides it as input to the software logic "L1" (using a pre-determined format) that is configured to process it and produce a corresponding Sudoku Puzzle as explained above. The logic L1 may be further configured to obtain input from the user.

In summary, the main difference between a preference credential and an authentication credential lies in the underlying data used as a basis for generating the respective credentials and whether that underlying data is incorporated in the clear as part of that credential. In the case of the preference credential the dataset comprises user (historical) data (or user stated preference) whereas in the case of the authentication credential the dataset comprises user's biometric data. Moreover, in the case of the preference credential the preference data is incorporated into the credential whereas in the case of the authentication credential, user data is not incorporated into the credential.

Using Authentication and Preference Cards

In the discussion presented above, we described the exemplary case of chatbots that "listen in" to on-going chats and their service logic may make contextual suggestions, such as restaurant recommendations. Consider the use case in which a user is using his computing device to chat with another user. The chat is being monitored by a chatbot, i.e., the chatbot is "listening in". The chatbot is configured to make restaurant suggestions to the user based on the context of the on-going chat session. The chatbot is configured to obtain restaurant choices from a third-party website such as Open Table.

Assume that based on the context of the on-going chat session, the chatbot decides to make a restaurant recommendation. Hence, it needs to ask Open Table to tell it a restaurant that the user may like. In other words, the chatbot session needs to authenticate the user to Open Table and present a restaurant preference credential to it to obtain the name and address of a restaurant. The following sequence of steps may be undertaken.

1. The chatbot requests the user computing device for an authentication credential.
2. The user computing device acquires and presents an authentication credential as described above (cf. FIG. 5A).
3. The chatbot presents the authentication credential to Open Table who may request third-party verification. Having received a positive acknowledgement, Open Table informs the chatbot that the user has been authenticated.
4. The chatbot now requests the user computing device for a restaurant preference credential. Two cases may occur: (a) The computing device may possess such a preference credential in which case it may present it. (b) The computing device may request a new preference credential (cf. FIGS. 6 and 7). The chatbot presents the preference credential to Open Table.
5. Open Table requests and receives verification of the preference credential. It replies accordingly to the chatbot.

Next, consider the use case of a user located in a geographical area wherein a computer program R1 can control the area's temperature.

i. Computer program R1 requests user's computing device to provide temperature preference credential.
ii. The computing device contacts a broker to locate the address of a provider of preference credentials. It then requests the preference provider for a credential (cf. FIG. 7) and presents the resulting credential to R1.

In another embodiment, the preference provider may anticipate the user requests and may place a user's preference dataset on the blockchain, a priori, to receiving user requests for preference credentials.

Illustrative Embodiments

The following are some embodiments of the present invention and are described herein for illustrative purposes without limiting the present invention in any manner.

Customization of services and computer controlled devices and environments: A user enters a home whose temperature is controlled by a smart thermostatic device (containing specialized software logic). The computing device of the user is queried by the smart thermostatic device and obtains the user's relevant credentials (authorization and preference) and the temperature of the home is established according to the user's preference.

A user enters a smart car whose music system is controlled by a device (containing specialized software logic). The computing device of the user authenticates the user to the smart car via authentication credentials and may use preference credentials to dictate the playlist for the music controlling device.

Eliminating user names and passwords: User's biometric data is encapsulated as authentication credentials allowing him to access computers and services without having to create, remember and use mechanisms based on user names and passwords. Since the authentication credentials are cryptographically secure, the security of computer operations is enhanced. Since the credentials may reveal limited and user permitted data only, a user's data privacy is maintained and preserved.

Use of preference credentials in everyday commerce and transactions: In an embodiment, the preferential credentials may be stored in a physical device much like a credit card that may then be physically presented to a vendor by the user who may then use a Point of Sale (POS) terminal to accept the presented card. Alternatively, the credential may be stored in an application of the user computing device, e.g., a wallet app, and rendered on a display of the computing device of the user from whence it may be scanned by a POS terminal, etc. Near field communications and other practices known in prior art may be used to present the credential to a vendor who may then use many previously known methods and technologies to transmit the presented credential for verification.

Consider a user whose personal data includes his date of birth. It is then easy to construct logic that may be used to ensure that the user's age is more than 21 years (e.g., current date minus user's date of birth equals user's age). Using such logic on a user's personal dataset and KGE and PGE, we may generate preference credentials as described above. In particular, a user may obtain a preference (cryptographic) credential asserting that his age is greater than 21. Moreover, this assertion is verifiable, again using the methods described above.

The age-related preference credential may be encapsulated in a physical card or in an app such as a wallet app where it may be rendered on the user's display device. The user may now present the credential as a physical card to a vendor who may verify it as above using special verification-supporting POS terminals. Alternatively, the vendor may be presented the rendering of the credential on the user's display device. Note that the advantage to the user is that the only information he provides to the vendor is that his age is greater than 21 and there is no need for him to reveal any other personal data such as his name or date of birth.

Reference Implementation of Credentials

Figure 9:
FIG. 9 illustrates a wallet app with cryptographic preference credentials.
Figure 10:
FIG. 10 illustrates one category of cryptographic preference credentials that may be stored in a wallet app.
Figure 11:
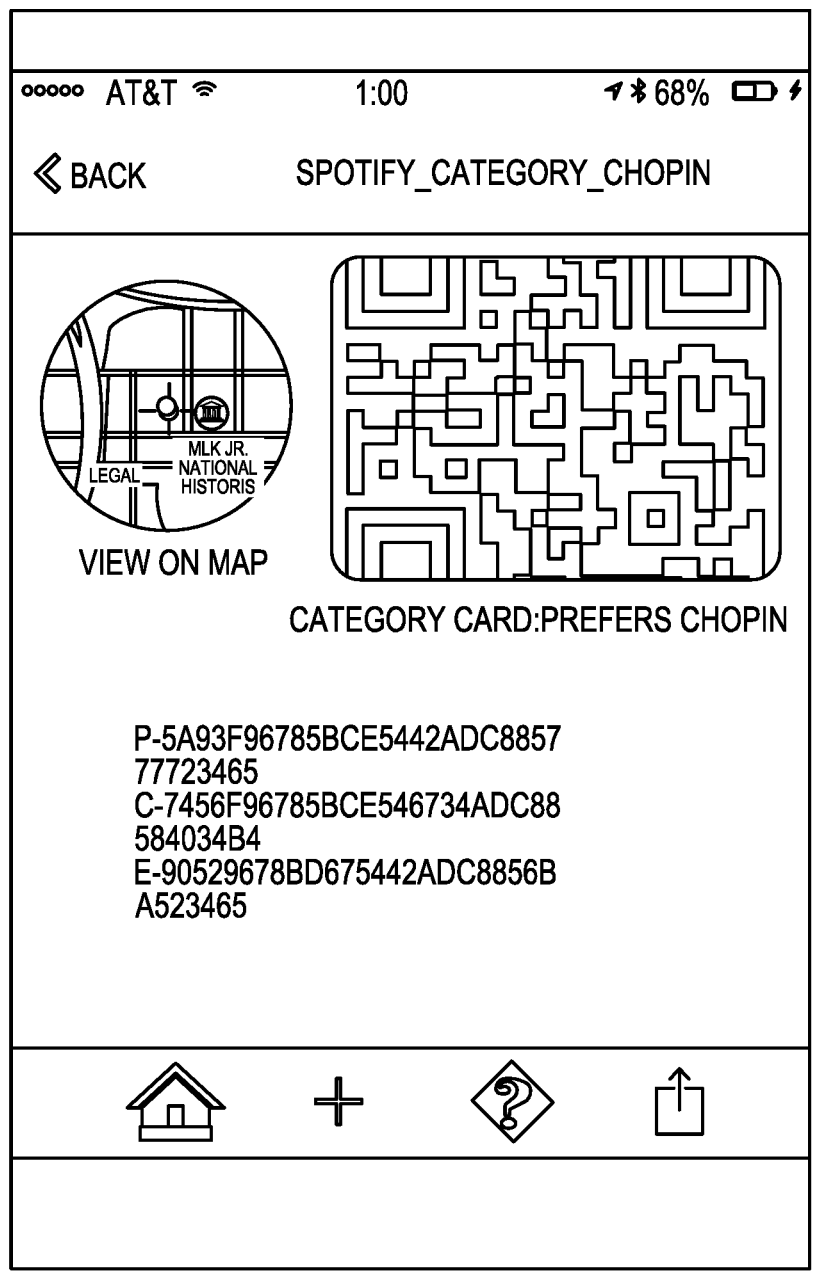
FIG. 11 illustrates an example of a cryptographic preference credential that may be stored in a wallet app.

FIG. 9-11 show exemplary implementations of a wallet app. FIG. 9 shows the wallet app having different categories of credentials. FIG. 10 shows an expanded list of preference credentials rendered in the wallet app of the user's computing device. FIG. 10 shows a rendering of one credential, viz., the "Spotify Category Chopin" credential. Note that the cryptographic data of the credential is represented as the sequence of hexadecimal digits [0,1, A-F] and also as the QR code that may be scanned.

Illustrative Architecture

Figure 12:
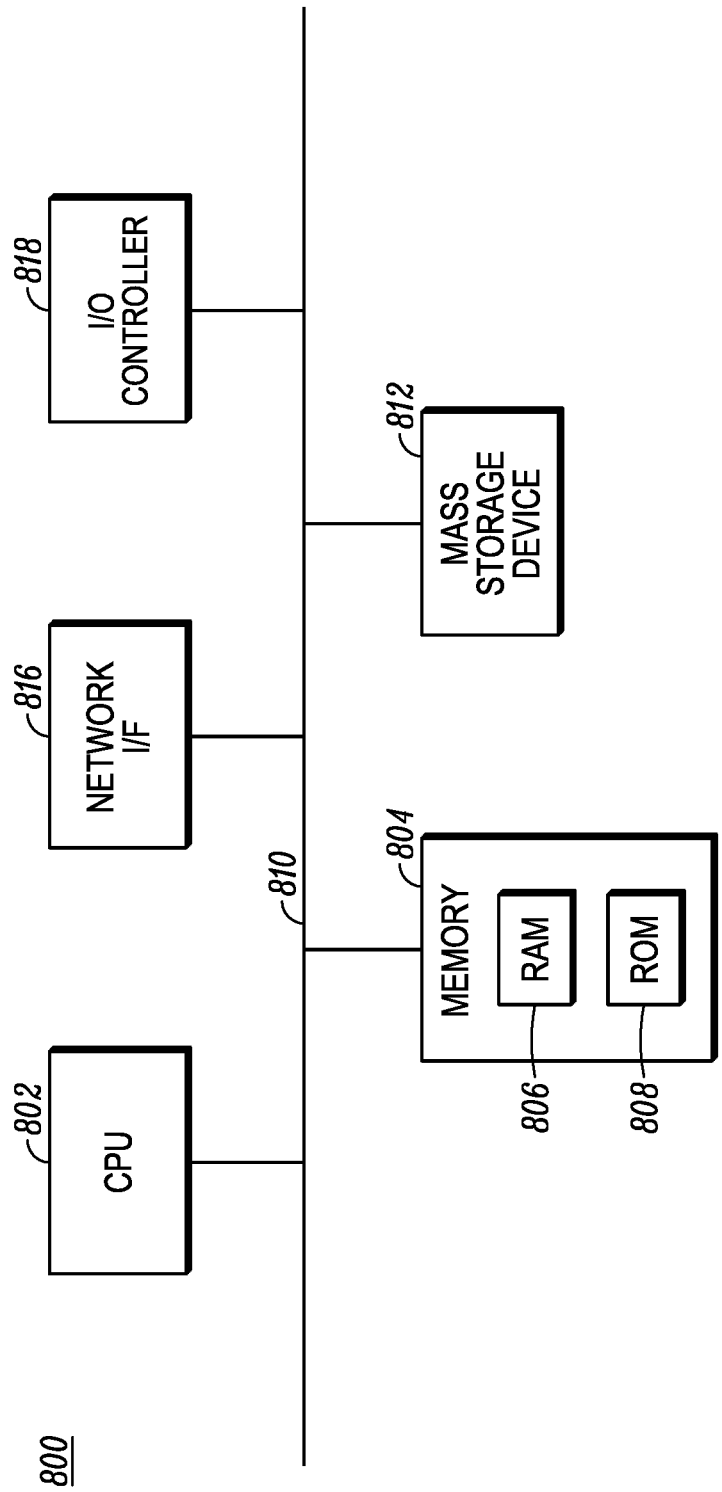
FIG. 12 shows an example architecture for a device such as the computing device or any of the sub-units (e.g., the cryptographic credential issue, the storage system and the verifier) of the service provider described herein which are capable of executing the various components described herein for implementing aspects of the content dissemination techniques described herein.

FIG. 12 shows an example architecture 800 for a device such as the computing device or any of the sub-units (e.g., the cryptographic credential issue, the storage system and the verifier) of the service provider described herein which are capable of executing the various components described herein for implementing aspects of the content dissemination techniques described herein. Thus, the architecture 800 illustrated in FIG. 12 shows an architecture that may be adapted for a server computer, server complex, mobile phone, a PDA, a smartphone, a desktop computer, a netbook computer, a tablet computer, GPS device, gaming console, and/or a laptop computer. The architecture 800 may be utilized to execute any aspect of the components presented herein.

The architecture 800 illustrated in FIG. 12 includes a CPU (Central Processing Unit) 802, a system memory 804, including a RAM 806 and a ROM 808, and a system bus 810 that couples the memory 804 to the CPU 802. A basic input/output system containing the basic routines that help to transfer information between elements within the architecture 800, such as during startup, is stored in the ROM 808. The architecture 800 further includes a mass storage device 812 for storing software code or other computer-executed code that is utilized to implement applications, the file system, and the operating system.

The mass storage device 812 is connected to the CPU 802 through a mass storage controller (not shown) connected to the bus 810. The mass storage device 812 and its associated computer-readable storage media provide non-volatile storage for the architecture 800.

Although the description of computer-readable storage media contained herein refers to a mass storage device, such as a hard disk or CD-ROM drive, it should be appreciated by those skilled in the art that computer-readable storage media can be any available storage media that can be accessed by the architecture 800.

By way of example, and without limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 800.

According to various embodiments, the architecture 800 may operate in a networked environment using logical connections to remote computers through a network. The architecture 800 may connect to the network through a network interface unit 816 connected to the bus 810. It should be appreciated that the network interface unit 816 also may be utilized to connect to other types of networks and remote computer systems. The architecture 800 also may include an input/output controller 818 for receiving and processing input from a number of other devices, including a keyboard, mouse, or electronic stylus (not shown in FIG. 12). Similarly, the input/output controller 818 may provide output to a display screen, a printer, or other type of output device (also not shown in FIG. 12).

It should be appreciated that the software components described herein may, when loaded into the CPU 802 and executed, transform the CPU 802 and the overall architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 800 in order to store and execute the software components presented herein. It is also contemplated that the architecture 800 may not include all of the components shown in FIG. 12, may include other components that are not explicitly shown in FIG. 12, or may utilize an architecture completely different from that shown in FIG. 12.

The above description of illustrated examples of the present invention is not intended to be exhaustive or limited to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of generating a cryptographic credential for authenticating a user, comprising:

receiving, by a user interface of a computing device, user data from the user to be authenticated;

generating, by the computing device, a proving key (PK), a verifying key (VK) that is complementary to the PK, and an encrypted data object that represents the user data, the generating being performed by inputting service logic and the user data to a key generating engine (KGE) such that the PK, the VK and the encrypted data object are all a function of both the service logic and the user data;

generating, by the computing device, a cryptographic proof by inputting the PK and the encrypted data object to a proof generating engine (PGE) such that the user data represented by the cryptographic proof is verifiable by inputting the cryptographic proof, the VK and the encrypted data object to a proof verifying engine (PVE);

creating the cryptographic credential from (i) the cryptographic proof and the encrypted data object or (ii) the VK and the encrypted data object; and transmitting the one of the VK and the cryptographic proof that is not included in the cryptographic credential from the computing device to a verifying entity over one or more communication networks such that a third party receiving the cryptographic credential from the computing device is able to verify the user data represented by the cryptographic proof by sending the cryptographic credential to the verifying entity.

2. The method of claim 1, wherein creating the cryptographic credential includes generating the cryptographic credential on the computing device.

3. The method of claim 1, wherein the user data includes biometric data of the user.

4. The method of claim 3, wherein the biometric data is fingerprint data.

5. A method of generating a cryptographic credential for authenticating a user, comprising:

receiving, by a user interface of a computing device, user data from the user to be authenticated;

generating, by the computing device, a PK, a VK that is complementary to the PK, and an encrypted data object that represents the user data, the generating being performing by inputting service logic and the user data to a KGE such that the PK, the VK and the encrypted data object are all a function of both the service logic and the user data;

generating, by the computing device, a cryptographic proof by inputting the PK and the encrypted data object to a PGE such that the user data represented by the cryptographic proof is verifiable by inputting the cryptographic proof, the VK and the encrypted data object to a PVE;

transmitting the cryptographic proof, the encrypted data object and the VK to a service provider over one or more communication networks, the service provider generating a second PK, a second VK that is complementary to the second PK, a second encrypted data object that represents the encrypted user data object plus additional data, and a second cryptographic proof, the generating being performing by inputting second service logic and the encrypted user data object plus the additional data to a second KGE such that the second PK, the second VK and the second encrypted data object are all a function of both the second service logic and the encrypted user data object plus the additional data, the generating of the second cryptographic proof being performed by inputting the second PK and the second encrypted data object to a second PGE;

receiving, by the computing device over one or more communication networks, a cryptographic credential created by the service provider from (i) the second cryptographic proof and the second encrypted data object or (ii) the second VK and the second encrypted data object; and providing the cryptographic credential to a third party that is able to verify the user data represented by the cryptographic proof by sending the cryptographic credential to a verifying entity that is in possession of the one of the second VK and the second cryptographic proof that is not included in the cryptographic credential.

6. The method claim 5, further comprising:

storing the cryptographic credential on a storage medium associated with the computing device so that it is retrievable by an electronic wallet application executable on the computing device;

responsive to a user request to provide the cryptographic credential to the third party, requesting receipt of another representation of the user data through the user interface of the computing device, the electronic wallet application only providing the cryptographic credential to the third party if the user data is determined to match the another representation of the user data.

7. The method of claim 5, further comprising receiving the KGE and the PGE from the service provider.

8. The method of claim 7, wherein the KGE and the PGE are included in an application executable on the computing device.

9. The method of claim 5, wherein the service provider includes a blockchain system for storing the second PK, the second VK and the second encrypted data object.

10. A method of generating a cryptographic credential for authenticating a user, comprising:

receiving from a computing device over one or more communication networks a verifying key (VK) that is complementary to a proving key (PK), an encrypted data object that represents user data received by the computing device from the user and a cryptographic proof, the PV, VK and the encrypted data object having been generated on the computing device by inputting service logic and the user data to a key generating engine (KGE) such that the PK, the VK and the encrypted data object are all a function of both the service logic and the user data, the cryptographic proof having been generated by the computing device by inputting the PK and the encrypted data object to a proof generating engine (PGE) such that the user data represented by the cryptographic proof is verifiable by inputting the cryptographic proof, the VK and the encrypted data object to a proof verification engine (PVE);

generating a second PK, a second VK that is complementary to the second PK, a second encrypted data object that represents the encrypted user data object plus additional data, and a second cryptographic proof, the generating of the second PK, the second VK and the second encrypted data object being performing by inputting second service logic and the encrypted user data object plus the additional data to a second KGE such that the second PK, the second VK and the second encrypted data object are all a function of both the second service logic and the encrypted user data object plus the additional data, the generating of the second cryptographic proof being performed by inputting the second PK and the second encrypted data object to a second PGE;

creating a cryptographic credential from (i) the second cryptographic proof and the second encrypted data object or (ii) the second VK and the second encrypted data object; transmitting the cryptographic credential to the computing device over the one or more communication networks; and transmitting the one of the second VK and the second cryptographic proof that is not included in the cryptographic credential to a verifying entity such that a third party receiving the cryptographic credential from the computing device is able to verify the user data represented by the cryptographic proof by sending the cryptographic credential to the verifying entity.

11. The method of claim 10, wherein transmitting the cryptographic credential to the computing device and transmitting the one of the second VK and the second cryptographic proof that is not included in the cryptographic credential to the verifying entity are performed as an atomic operation.

12. The method of claim 10, wherein the first and second KGEs are the same or different KGEs.

13. The method of claim 10, wherein the first and second PGEs are the same or different PGEs.

14. The method of claim 10, further comprising storing the second PK, the second VK and the second encrypted data object in a blockchain system.

15. A method of generating a cryptographic preference credential that stores user preference data, comprising:

receiving, by a computing device, user preference data of a user;

generating, by the computing device, a proving key (PK), a verifying key (VK) that is complementary to the PK, and an encrypted data object that represents the user preference data, the generating being performed by inputting service logic and the user preference data to a key generating engine (KGE) such that the PK, the VK and the encrypted data object are all a function of both the service logic and the user preference data;

generating, by the computing device, a cryptographic proof by inputting the PK and the encrypted data object to a proof generating engine (PGE) such that the user preference data represented by the cryptographic proof is verifiable by inputting the cryptographic proof, the VK and the encrypted data object to a proof verifying engine (PVE);

creating the cryptographic credential from the user preference data in an unencrypted form and either the (i) the cryptographic proof and the encrypted data object or (ii) the VK and the encrypted data object; and transmitting the one of the VK and the cryptographic proof that is not included in the cryptographic credential from the computing device to a verifying entity over one or more communication networks such that a third party receiving the cryptographic credential from the computing device is able to verify the user preference data represented by the cryptographic proof by sending the cryptographic credential to the verifying entity.

16. The method of claim 15, wherein receiving the user preference data includes receiving the user preference data directly from the user.

17. The method of claim 15, wherein receiving the user preference data includes receiving the user preference data from a third party with whom the user has previously interacted.

18. The method of claim 17, wherein user and the third party have interacted over one or more communication networks.

19. The method of claim 17, wherein the user preference data is acquired by the third party in a heuristic manner based on information obtained during the previous interactions with the user.

20. A method of generating a cryptographic preference credential that stores user preference data, comprising:

obtaining user preference data of a user;

generating, by a computing entity that interacts with the user via a user computing device, a proving key (PK) and a verifying key (VK) that is complementary to the PK, the generating being performed by inputting service logic to a key generating engine (KGE) such that the PK and the VK are both a function of the service logic;

generating, by the computing entity, a cryptographic proof by inputting the PK and a data object representative of the user preference data to a proof generating engine (PGE) such that the user preference data represented by the cryptographic proof is verifiable by inputting the cryptographic proof, the VK and the encrypted data object to a proof verifying engine (PVE);

creating the cryptographic credential, the cryptographic credential including the user preference data in an unencrypted form and either the (i) the cryptographic proof and the data object or (ii) the VK and the data object; and transmitting the one of the VK and the cryptographic proof that is not included in the cryptographic credential to a verifying entity over one or more communication networks such that a third party receiving the cryptographic credential from the computing device is able to verify the user preference data represented by the cryptographic proof by sending the cryptographic credential to the verifying entity.

21. The method of claim 20, wherein the data object representative of the user preference data is the user preference data.

22. The method of claim 20, wherein generating the PK and the VK includes generating, by the computing entity that interacts with user via a user computing device, the proving key (PK), the verifying key (VK) that is complementary to the PK, and an encrypted data object that represents the user preference data, the generating being performed by inputting the service logic and the user preference data to the key generating engine (KGE) such that the PK, the VK and the encrypted data object are all a function of both the service logic and the user preference data, wherein the data object representative of the user preference data is the encrypted data object.

* * * * *